No. 619,776. Patented Feb. 21, 1899.
P. MURRAY.
GAS ENGINE.
(Application filed May 1, 1896.)
(No Model.) 10 Sheets—Sheet 1.

WITNESSES: INVENTOR
Robert Soellenger Peter Murray,
R. B. Blomeke BY Drake & Co. ATTY'S.

No. 619,776. Patented Feb. 21, 1899.
P. MURRAY.
GAS ENGINE.
(Application filed May 1, 1896.)
(No Model.) 10 Sheets—Sheet 2.

WITNESSES:
Robert Sollberger
C. B. Pitney

INVENTOR
Peter Murray
BY Drake & G. ATTY'S.

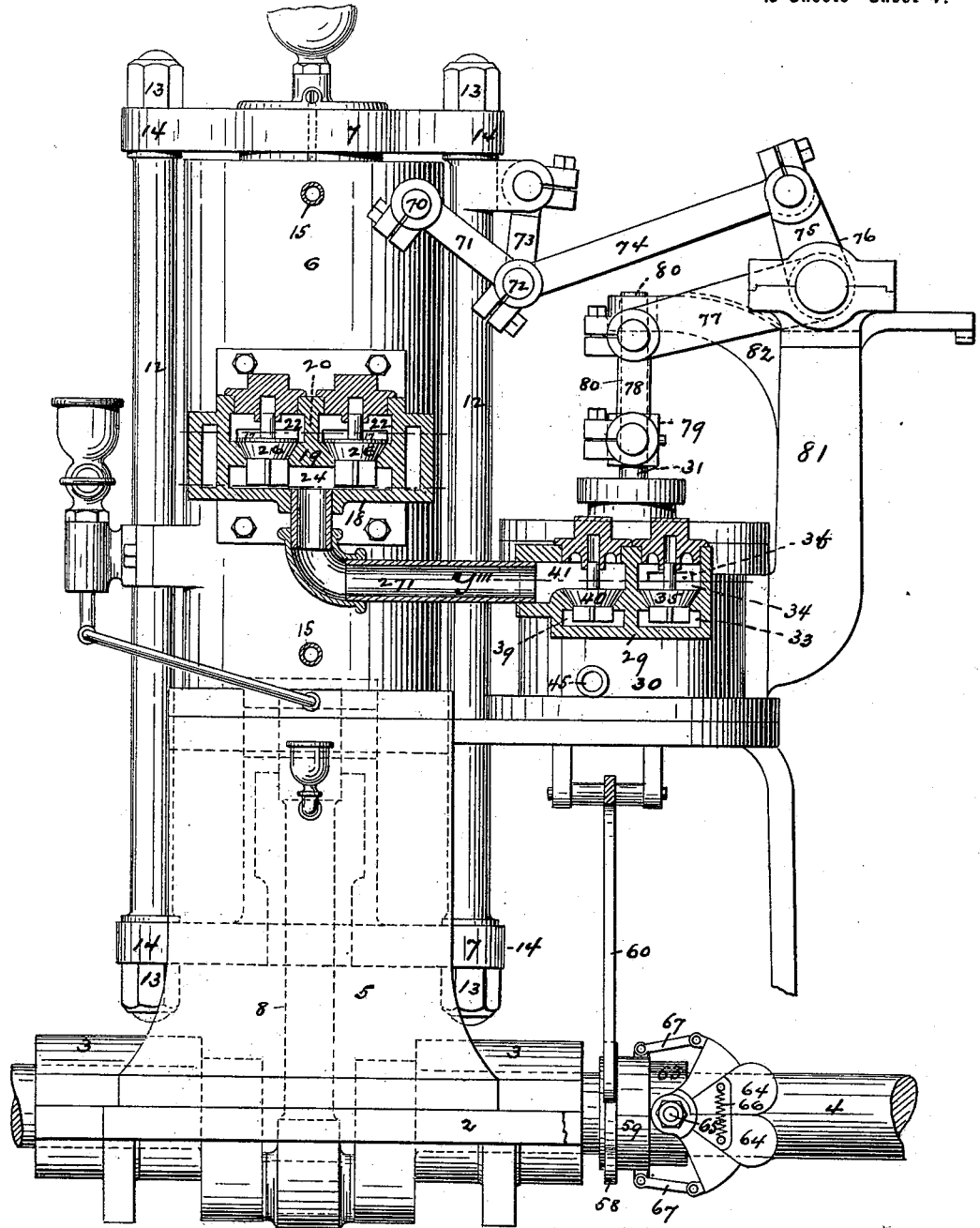

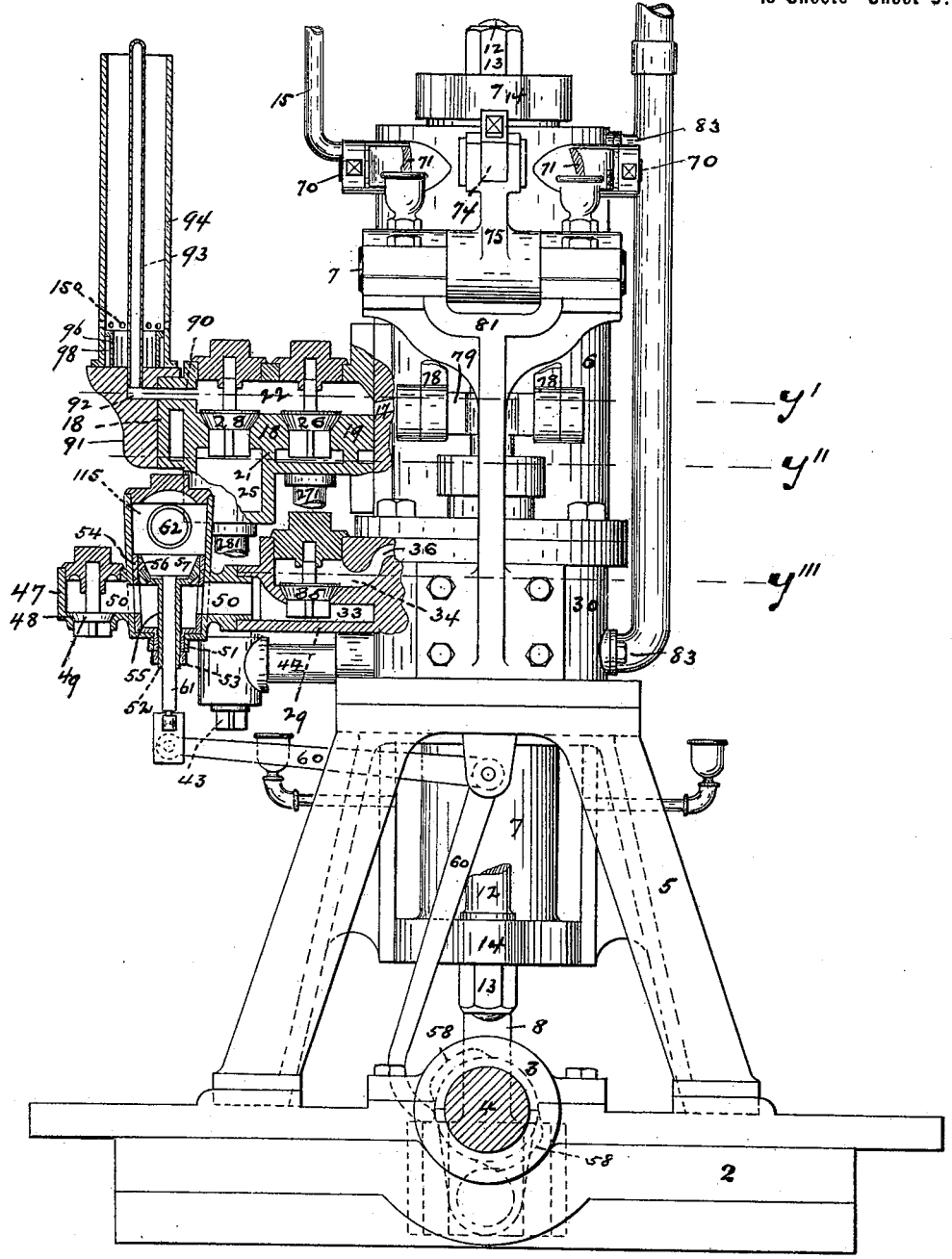

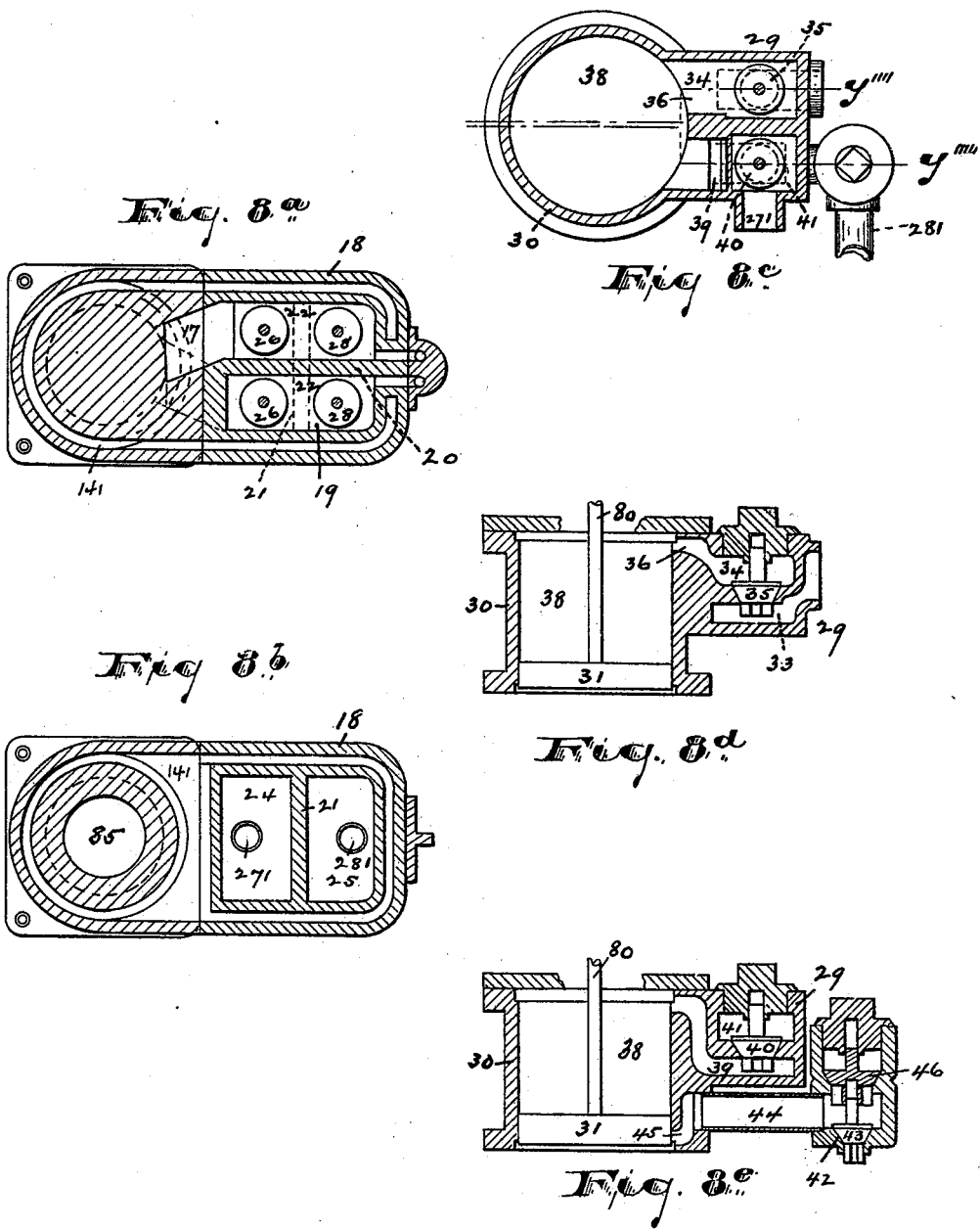

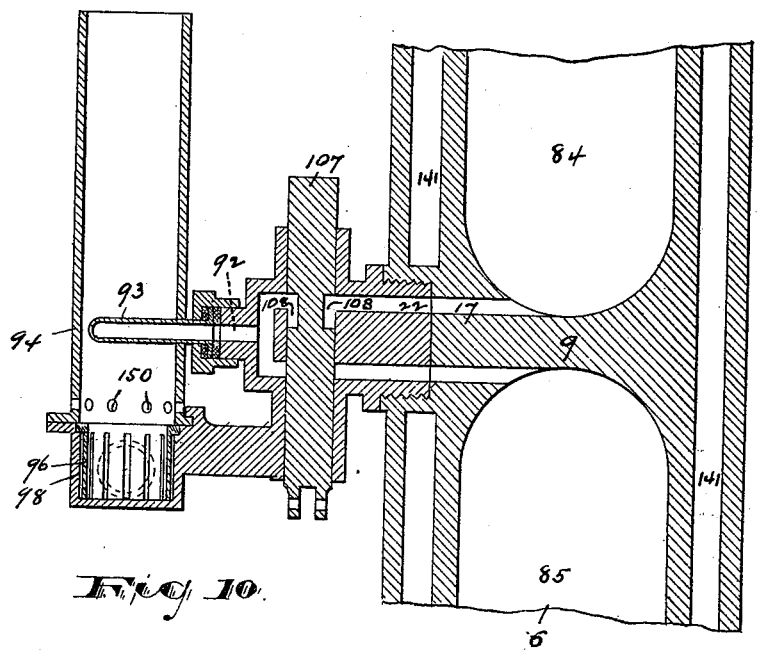

No. 619,776. Patented Feb. 21, 1899.
P. MURRAY.
GAS ENGINE.
(Application filed May 1, 1896.)
(No Model.) 10 Sheets—Sheet 9.

WITNESSES:
R. B. Blomeke
C. B. Pitney

INVENTOR:
Peter Murray,
BY Drake & Co. ATTY'S

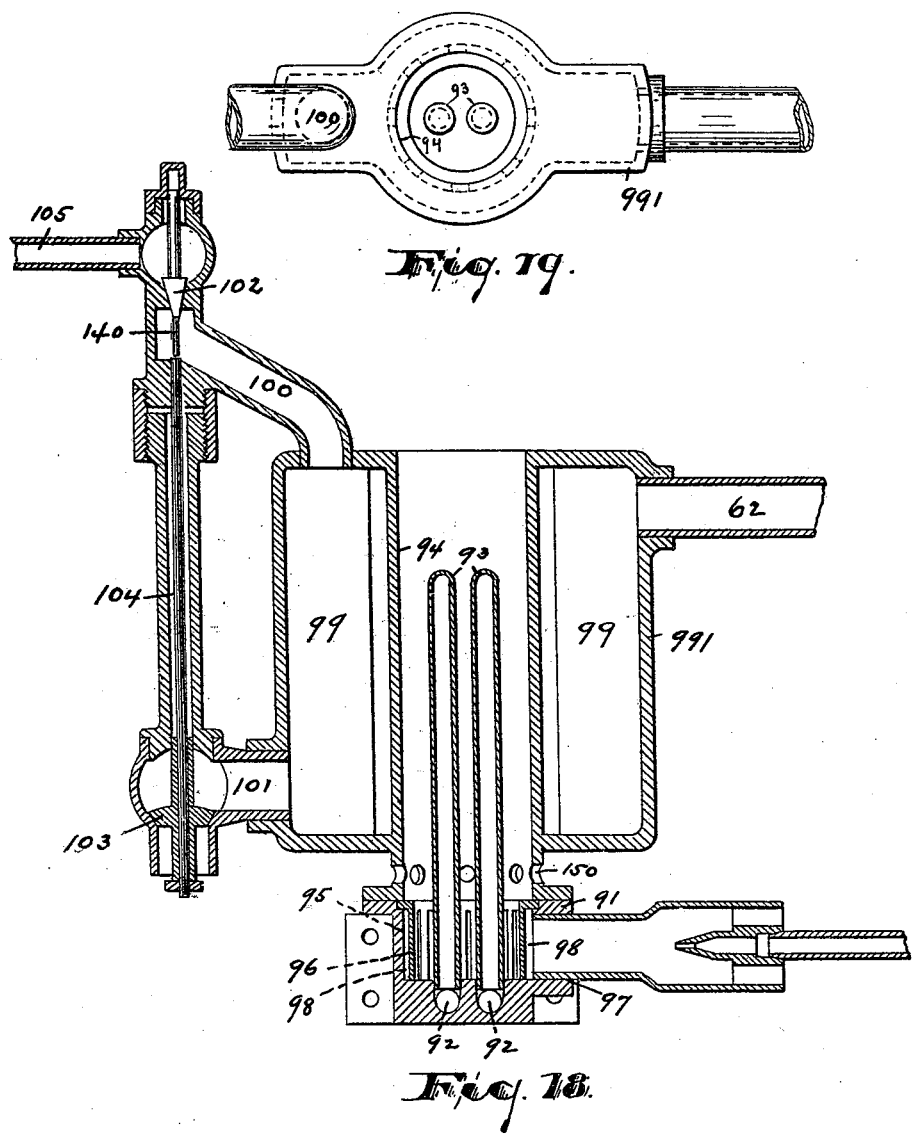

UNITED STATES PATENT OFFICE.

PETER MURRAY, OF NEWARK, NEW JERSEY, ASSIGNOR, BY MESNE ASSIGNMENTS, TO THE STANDARD GAS ENGINE COMPANY, OF NEW JERSEY.

GAS-ENGINE.

SPECIFICATION forming part of Letters Patent No. 619,776, dated February 21, 1899.

Application filed May 1, 1896. Serial No. 589,818. (No model.)

*To all whom it may concern:*

Be it known that I, PETER MURRAY, a citizen of the United States, residing at Newark, in the county of Essex and State of New Jersey, have invented certain new and useful Improvements in Gas-Engines; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The objects of this invention are to secure in a gas-engine increased power from a given expenditure of gas, to obtain greater uniformity of speed or action and to render the engine more compact, so that an engine of a given power will occupy a smaller space than is occupied by the engines heretofore in use, to prevent back firing, "tardy firing," or premature explosions, and to secure other advantages and results, some of which may be referred to hereinafter in connection with the description of the working parts.

The invention consists in the improved gas-engine, in the arrangements and combinations of parts thereof, and in the improved process of preventing premature explosion or firing of the mixture of inflammable or explosive gases, all substantially as will be hereinafter set forth and finally embraced in the clauses of the claim.

Figure 5:
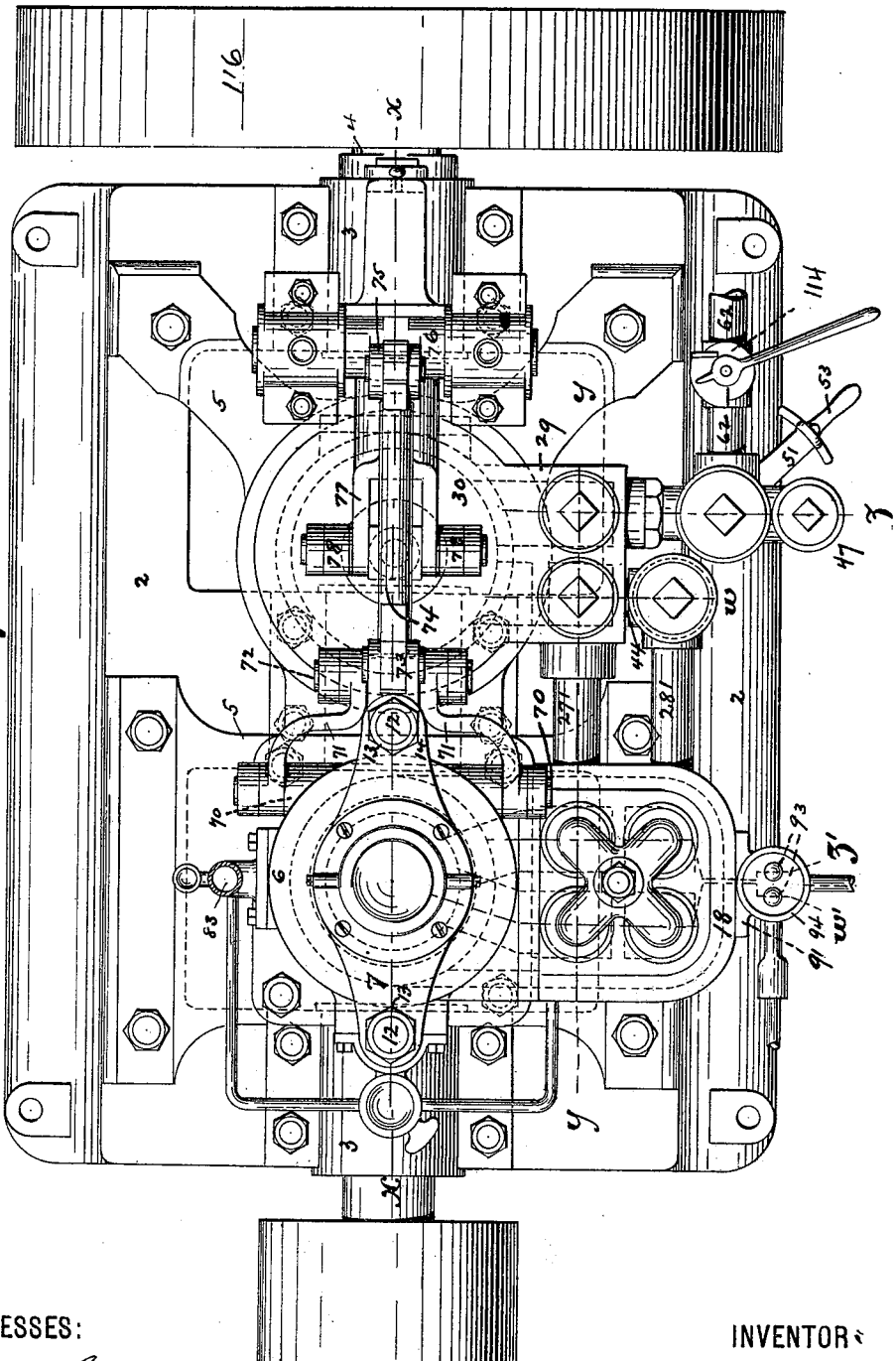
Figure 6:
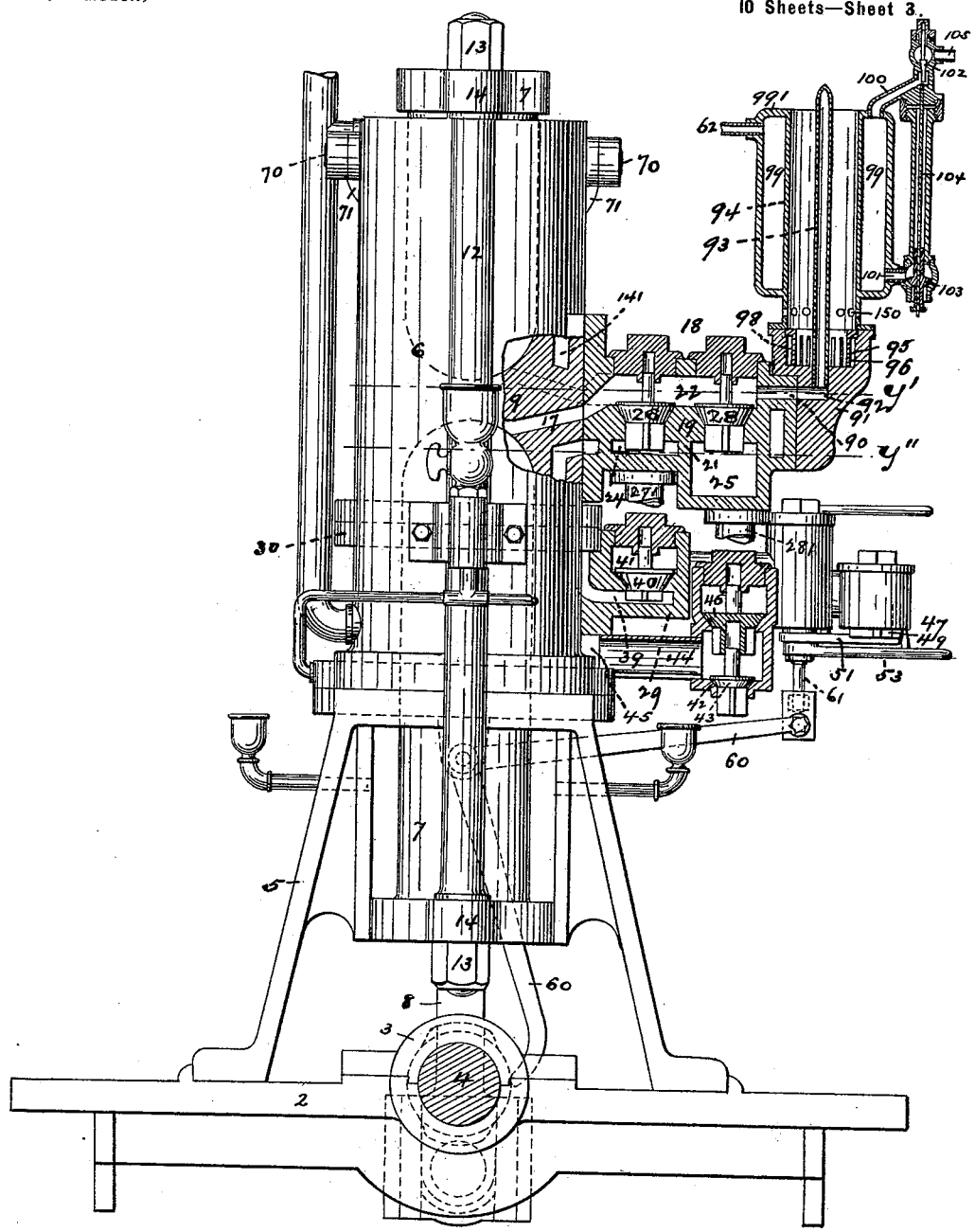
Figure 9:
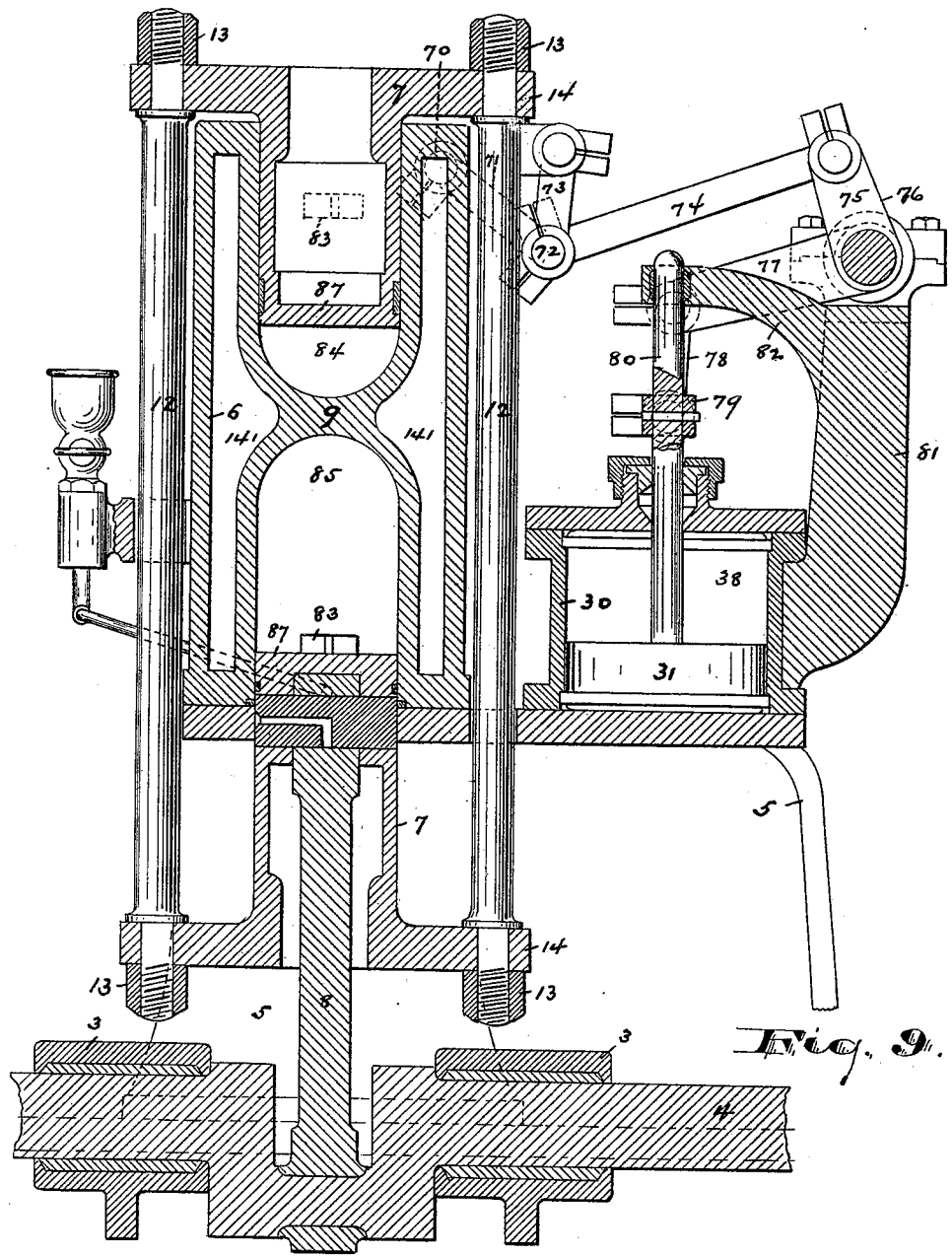
Figure 13:
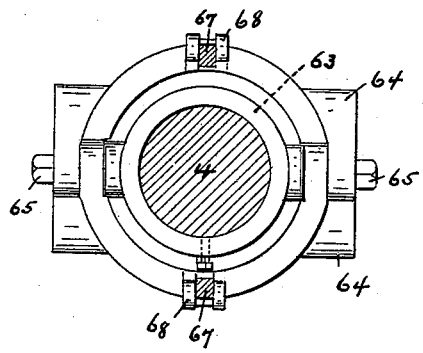
Figure 14:
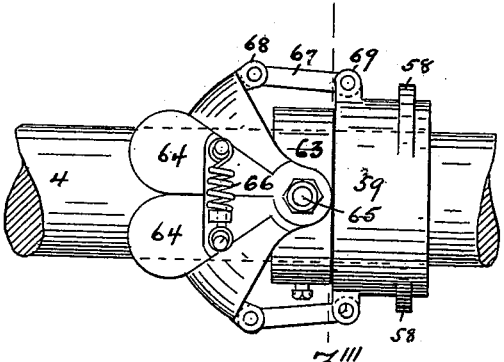
Figure 15:
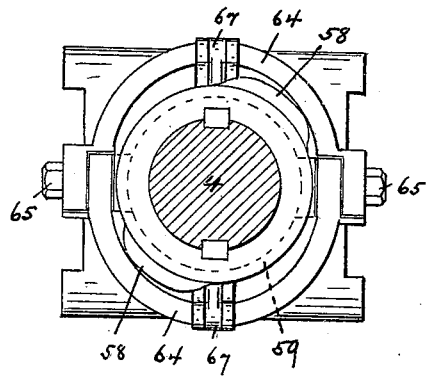
Figure 16:
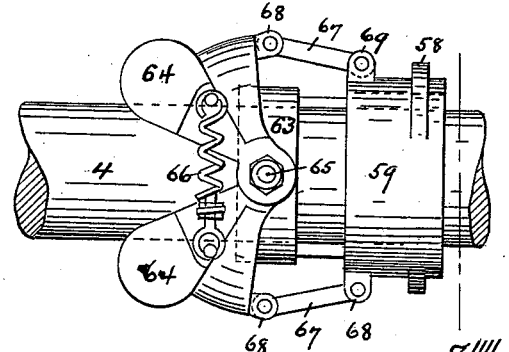
Figure 17:
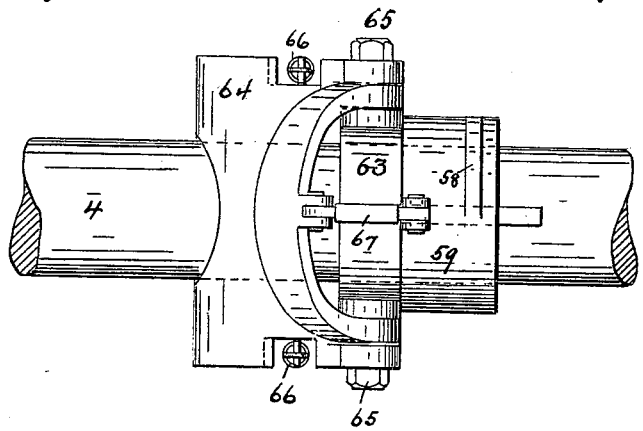

Referring to the accompanying drawings, in which like numerals of reference indicate corresponding parts in each of the several views, Figures 1, 2, 3, and 4 are diagrammatic sections illustrating certain relations of parts more clearly and the operations of the same. Fig. 5 is a plan of the engine. Fig. 6 is a side elevation, partly in section, the section of the power-cylinder valve-chests being taken on line $w'$ and the section of the pump extension being on line $w$, Fig. 5. Fig. 7 is a front elevation, partly in section, the section being taken on line $y$. Fig. 8 is another side elevation, partly in section, the section being taken on line $z$, Fig. 5, through the pump extension and mixing device, and the section $z'$ being taken through the valve-chest of the power-cylinder. Fig. $8^a$ is a horizontal sectional detail of the power-cylinder and valve-chest, taken through line $y'$, Figs. 6 and 8; and Fig. $8^b$ is a similar section taken on line $y''$, same figure. Fig. $8^c$ is a horizontal section of the pump-cylinder and its extension, the said section being taken at line $y'''$, Figs. 7 and 8. Fig. $8^d$ is a section of Fig. $8^c$, taken at irregular line $y''''$; and Fig. $8^e$ is a section through the same figure at irregular line $y'''''$. Fig. 9 is a vertical section of parts of the engine, taken on line $x$, Fig. 5. Fig. 10 is a sectional detail illustrating a firing device which I prefer to employ in engines of high compression or of a large size. Figs. 11 and 12 are sectional views showing means for electrical firing when such method of firing is employed, Fig. 12 being a section on line $z''$, Fig. 11. Figs. 13 to 17, inclusive, are detail views of an improved governor for the engine. Fig. 13 is a back end sectional view, the section being taken at line $z'''$, Fig. 14. Fig. 14 is a side view showing the governing-weights closed or in their normal positions. Fig. 15 is a section taken on line $z''''$ of Fig. 16, and Fig. 16 is a side view showing the weights thrown outward by centrifugal force produced by excessive speed. Fig. 17 is a detail plan of the governor. Fig. 18 is a sectional detail showing the construction of vaporizer employed in connection with the chimney of the engine, and Fig. 19 is a plan showing the upper portion of the said vaporizer.

In the construction presented in the drawings the engine is shown as planned for a marine engine, 2 indicating the bed-plate, which may be supported by the timbers of the vessel in any manner desirable. Where the engine is to be employed for other purposes, the bed-plate and other parts may be varied accordingly. Said bed-plate provides boxes or bearings 3 for a crank-shaft 4 and supports a frame 5, upon which the power-cylinder 6 is secured, said cylinder being arranged vertically upon said frame above the pin of the crank-shaft. The power-piston is a frame-like structure extending both in and outside of said cylinder, the heads 87 working in said cylinder and one of said heads being connected to the crank by the rod 8, as clearly indicated in Fig. 9.

The cylinder 6 is divided at or near the center of its length by a partition or diaphragm 9, forming two chambers 84 85 to receive the cylindrical piston-heads or portions 87 87 of the piston, the said chambers 84 85 being open at the opposite ends of the power-cylinder 6, as shown in Figs. 1, 2, 3, 4, and 9. The said cylindrical portions or heads 87 of the piston are connected together by rods 12 12 and nuts 13 13, so as to obtain simultaneous action of said heads. The heads are provided with laterally-projecting flanges 14 to receive said rods 12. The power-cylinder is also provided with a water-chamber 141, surrounding the chambers 84 85, and when filled with water undue heating of said cylinder is prevented. A circulation is maintained in the water-chamber through inlet and outlet ducts or pipes 15, Fig. 7.

Near the opposite ends the power-cylinder is provided with exhaust-ports 83 and toward the center with gas-inlet ports 17, each chamber being supplied with an exhaust-port and a gas-supply port, as will be understood. The gas supply or inlet ports extend through the walls of the power-cylinder 6 and connect with chambers or passages 22 in the upper part of the valve-chest 18, attached to one side of said cylinder. Said valve-chest is shown more clearly in Figs. 5, 6, 7, 8, 8ᵃ, and 8ᵇ and is provided with a horizontal partition 19, dividing the space therein into upper and lower parts, which parts are subdivided by vertical partitions 20 21, which lie in crossing planes, as indicated in Fig. 8ᵃ. The inlet-port 17 of one of the compartments or cylinder-chambers 84 85 is in open communication with one of the upper chambers 22, formed by the partition 20 in the valve-chest, while the other of said chambers 22 communicates with the other power-cylinder chamber. Each of the chambers 22 has communication through valved openings with the gas and air chambers 24 25, formed beneath the partition 19, the said openings allowing an inflow of gas or an inflammable mixture of gas and air from the chamber 24 and alternately with said inflow of gas an inflow of pure air from the chamber 25, as will be hereinafter described. Of each chamber 22, Fig. 8ᵃ, 26 26 represent the gas-valves closing the opening to the gas-chamber 24 beneath, and 28 are the air-valves closing the openings to the air-chamber 25.

The chamber 25 is preferably made considerably larger than the chamber 24 to prevent an excess of pressure therein. The chambers 24 and 25 connect through pipes or ducts 271 281 with a valved and chambered extension 29 of a pump-cylinder 30, the valves, chambers, and passages of said parts being so arranged in connection with the pump as that when the pump-piston 31 is operated charges of inflammable gas will be forced through the pipe 271 to the gas-chamber 24 alternately with charges of air through the pipe 281 into the chamber 25, the alternation of charges being in very rapid succession, so that at every stroke of the piston 7 there will be forced through said pipes 271 281 independent charges of both gaseous mixture and pure air, an action requiring two strokes of the pump-piston where a single pump is employed to force the two fluids to every stroke of the power-piston.

The chambers, passages, and valves in the pump extension 29 are formed as shown in Figs. 7, 8, 8ᶜ, 8ᵈ, and 8ᵉ, where the said extension is indicated as cored out to form a gas and air mixture chamber 33, receiving its supply of gas and air through a suitable valved air-opening and from a gas-supply pipe in any manner desired. 34 is a chamber adjacent to said chamber 33 and communicating therewith through a valved opening, the valve 35 closing said opening when the pump-piston 31 produces a pressure in said chamber 34. Said chamber 34 is in open communication through the passage 36, Fig. 8, with the pump-cylinder chamber 38, at one end thereof. Also within the extension 29 and in communication with the pump-cylinder chamber is formed a chamber 39, Figs. 8ᶜ and 8ᵉ, which receives the inflammable mixture from the pump-chamber and leads it to the opening for the valve 40, through which it passes to the chamber 41, communicating with the pipe 271. Upon the descent of the pump-piston 31 the mixture of gas and air is drawn through the chamber 33, opening of the valve 35 into the chamber 34, and thence into the cylinder-chamber 38, filling the vacuum that would otherwise be formed. A return stroke of the pump-piston closes the valve 35 and raises the valve 39, so that the inflammable mixture is forced out from the said pump-cylinder through the chamber 39, opening of the valve 40 into the chamber 41, whence it is conducted through the pipe 270 to the gas-chamber 24 of the valve-chest 18 of the power-cylinder.

When the pump-piston 31 forces out the combustible or explosive mixture through the pipe 271, as above described, it at the same time draws a charge of atmospheric air into the pump-cylinder chamber 38, said air entering through the air-inlet 42, provided with a valve 43, and through the pipe 44 and cylinder-port 45 at the lower part of the pump-cylinder, as indicated in Figs. 6, 7, and 8ᵉ more clearly. Upon the return stroke of the pump-piston 31 the air-valve 43 will close automatically and the air will be forced through the valve 46 and into the pipe 281, whence it is conducted into the air reservoir or chamber 25 of the valve-chest 18 of the power-cylinder. The pressure produced by the descending pump-piston 31 raises the valve 28 when the air-pressure produced by said pump-piston exceeds the pressure within the power-cylinder, so that immediately after the opening of the exhaust-ports of the power-cylinder and a reduction of the pressure therein to a point below the pressure of the air in reservoir 25 the valve 28 opens and allows an inflow of air into the said power-cylinder, which air follows the outflowing product of combustion and flame and prevents the ignition of the charge of explosive mixture next to be introduced, the air displacing contents in the motor-cylinder equal to the contents in the pump-chamber.

To supply the mixture of gas and air to the chamber 33 of the pump extension and to regulate the proportions of the said air and gas, I have provided the arrangements of parts shown in Fig. 8. Here the said extension is provided with a regulating and mixing device 47, which consists of a chambered casting having an air-inlet 48, Figs. 6 and 8, provided with a valve 49, through which inlet-opening 48 the air enters to a passage or chamber 50 in open connection with the chamber 33. At one side or above the said passage or chamber 50 the chambered casting 47 provides a seat for a device 54, similar in construction to a plug-cock, said device 54 having a handle 51, adapted to open or turn the same pivotally within the casting to close off connection through the passage or chamber 50 or to regulate the flow therethrough. The said plug-cock or like device is made hollow and receives a second cock 55 or valve having a tubular extension 52 and handle 53. At the upper end the valve 55, having the tubular extension, engages a seat within the plug-cock 54, the said valve or cock 55 being provided with gas-passages 56, which may be opened or closed by turning the handle 53. Said passages 56 are opened or closed by the valve 57, which latter is operated regularly by cam projections 58 on a sliding sleeve 59, arranged on the crank-shaft 4 in connection with the governing devices upon said shaft. The cam projections 58 are preferably two in number, so as to secure two openings of the gas-passages at each revolution of the shaft to provide a supply of gas to each chamber 84 85 in the power-cylinder at every gas-suction stroke of the pump.

When the engine unduly accelerates its speed and it is found desirable that the supply of gas be cut off, the governor is operated by increased centrifugal force to cause the said sliding sleeve 59, having the cam projections 58, to slide out of engagement with the bell-crank lever 60, Figs. 7 and 8. The bell-crank lever 60 connects with the valve-stem 61 of the valve 57, the said valve-stem 61 being arranged in the tubular extension 52 and sliding longitudinally therein. By this construction it will appear that when the engine is at the normal rate of speed the gas is allowed passage from the gas-pipe 62, through chamber 115 of the extension 47, through passages 56 into the chamber or passage 50, the movements of the parts being so timed that the valve 57 is opened at each gas-suction stroke of the pump-piston. The gas is thus drawn regularly into the chamber 33 from the supply-pipe 62. The gas entering through the said passages 56, as described, is brought into connection with the air entering through the valve 49, the two bodies of fluid thoroughly commingling as they flow through the chamber 33, opening for the valve 35, and passages 34. The mixture thus being more perfect enters into the upper portion of the pump-cylinder chamber as the pump-piston descends. The valves 35 and 49 serve to prevent any outflow of gas from the chamber 33 into the open air upon the upward stroke of the pump, as will be understood.

I may employ any desirable form of governor for operating the gas-supply devices above described; but in marine engines or road-wagons I prefer the construction shown in Figs. 13, 14, 15, 16, and 17, where the crank-shaft 4 is provided at a point near the sliding sleeve or collar 59, having the cam projection 58, operating the gas-controlling valves, with a fixed collar 63, which is keyed or fixed to the said shaft 4. Said collar 63 is provided with yoke-like weights 64, which are pivoted at opposite sides of the shaft upon the bolts or screws 65, which latter serve to clamp the said collar 63 to the shaft. The said yoke-like weights are normally closed together against the shaft, as shown in Figs. 13 and 14, by springs 66. Said weights are connected to the sliding collar by rods 67, which are pivoted between suitable ears 68 and 69, formed upon the weights and sliding collar. By this construction when the shaft 4 attains an abnormally high rate of speed the weights 64 are thrown outward away from the shaft against the power of the springs 66. This action causes the sliding collar 59 to slide longitudinally on the shaft 4, so that the cam projections 58 are thrown away from engagement with the lever 60. The valve 57 thus remains closed and gas is prevented from being sucked into the pump-cylinder, air alone being thus drawn, and the engine being void of motive material is reduced in speed, all as will be understood.

To secure two strokes of the pump-piston for every one of the power-piston, as heretofore referred to, I have constructed a system of levers. (Shown in Figs. 5, 7, 8, and 9 and in the diagrammatic Figs. 1, 2, 3, and 4.) Here I have shown the power-cylinder provided with trunnions 70, upon which lever-like rods 71 are pivotally arranged. These rods extend laterally from the cylinder and engage or connect with a pivotal pin 72, to which pivoted rods 73 and 74 are secured, the said rod 73 being linked pivotally to the piston 7 or to one of the rods 12 thereof, and the said arm 74 being pivoted to a short arm 75 of a bell-crank lever 76, the longer arm 77 of said bell-crank lever being connected pivotally to the rod 78, connected to a cross-head 79, secured to the piston-rod 80 of the pump-piston. The fulcrumal pivots or journals of the bell-crank 76 are suitably arranged in boxes or bearings formed upon an arm, standard, or frame 81, attached to the pump-cylinder 30, said frame or standard having an arm 82, which provides an upper bearing for the outside projecting end of the said pump-piston rod 80. The rods 71 and 74 are pivotally joined together, to the power-cylinder, and to the shorter arm of the bell-crank in such a manner and relation as that when said rods 71 and 74 are brought into line with one another the piston of the power-cylinder will be at the center of a stroke. Thus when said power-piston is moving from said center toward opposite ends of its stroke the said rods 71 and 74 will be thrown out of alinement with one another, as shown in Figs. 7 and 9, and the distance between where the ends of said rods are connected to the cylinder and to the smaller end of the crank-shaft will be reduced. This reduction of distance will occur twice in every stroke of the power-piston, and thus the bell-crank will oscillate twice and the pump-piston with which it is connected will also make two strokes to every one stroke of the power-piston, as will be evident. Thus the gaseous inflammable mixture is forced into each of the power-cylinder chambers, and the said chambers are charged with air alternately at every stroke of the power-piston rod, resulting in a greater accession of power and a more regular movement than by any of the devices heretofore employed.

Figures 1, 2:
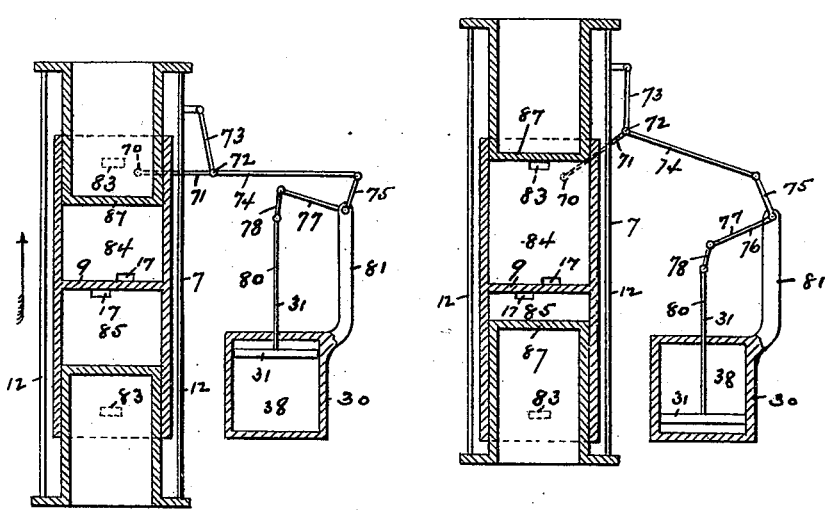
Figures 3, 4:
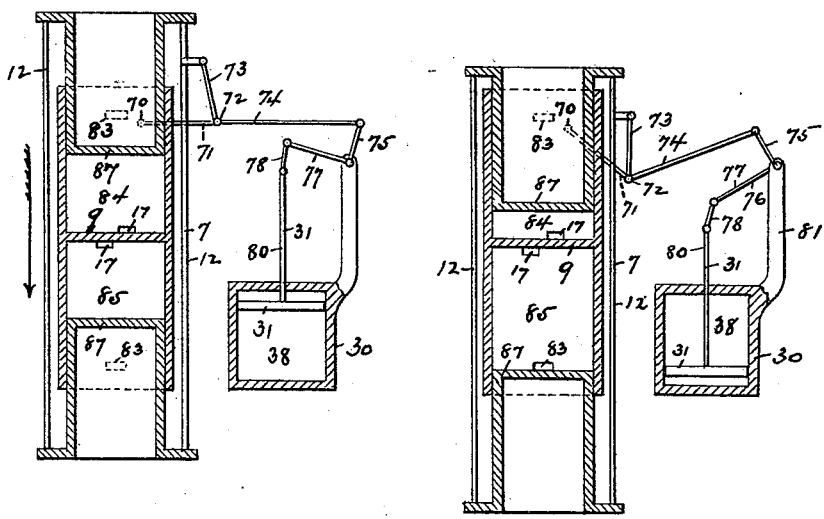

Referring to Figs. 1, 2, 3, and 4, presented to show more clearly the operation of the pump and power pistons and their operative relations to one another, it will be noted that in Fig. 1 the power-piston is at the middle of its stroke in its upward movement, the upper piston-head 87 being in act of traveling upward under the power produced by the expansion of the explosive mixture and the lower head also traveling upward and in the act of compressing a charge of gases. At this point of movement it will be observed that the rods 71 and 74 are in alinement. At the same time the piston of the pump is at the end of its upward movement and is about to descend and force a supply of air into the tank 25 preparatory to the said air entering the upper cylinder-chamber 84 when the upper piston has arrived at the exhaust-port 83. The continued upper movement of the power-piston from the position shown in Fig. 1 causes the rods 71 and 74 to pass out of alinement and assume the angular relation before referred to and shown in Fig. 2, which action causes the piston of the pump to be drawn downward to compress the air. It will be observed in Fig. 2 that the pump-piston is in its lowest position at which it has drawn in a supply of gas into the upper portion of the pump-cylinder and has forced out the air from the lower end of said pump-cylinder. At this time the upper piston of the power-cylinder has uncovered the exhaust-port 83, so that the products of combustion are free to pass out therethrough and reduce the pressure within the chamber 84. This reduction of pressure allows the air compressed in the chamber 25 to force up the valve 28, so that said air is free to flow into the said power-cylinder chamber 84, following up the out-flowing products of the explosive gases and so that any remnants of flame or particles of burning products therein will not have access to the mixed inflammable gases next to enter the chamber. The lower piston-head of the power-piston at this time is at a point where it produces the greatest compression upon the mixed gases in the lower power-cylinder chamber, as will be apparent upon reference to Fig. 2. The next position of the parts shown is in Fig. 3, where the power-piston is again at the center of its stroke, moving downward, propelled by the explosion and expansion of the charge in the lower power-cylinder chamber. At this point the pump-piston is at the upper end of the stroke and has forced the mixed gases into the upper chamber, following up the supply of air which was introduced therein as above described, and said pump-piston is about to descend and force another supply of air into air-reservoir 25 for the lower power-chamber and draw in a fresh supply of explosive mixture into the pump-chamber 38. In Fig. 4 the contents of the lower power-cylinder chamber 85 are at a point of exhaustion and the chamber is receiving the supply of air, while the inflammable contents of the upper power-cylinder chamber 84 are under greatest compression and are ready for or have just been ignited. It will thus be observed that each of the chambers 84 85 of the power-cylinder 6 receives alternately a charge of atmospheric air and a charge of combustible or explosive gas or gaseous mixture. It may be further observed that while in one power-cylinder chamber—84, for example—the air is rushing in and the exhaust products are flowing out in the other chamber, 85, the explosive gas is compressed and ready for or about being ignited. This action is repeated alternately. Again, it will be observed that by the construction and arrangement provided, when the pump-piston is at the beginning of one of its strokes and is about to force gas, for example, as in Fig. 2, into said power-cylinder chamber 84, the power-piston 87 is also at the beginning of its gas-compressing stroke, the two pistons move together, but because of the shortness or quickness of the pump stroke it will have completed its gas-forcing stroke about when the power-piston is at the middle of its stroke and will make a return and air-forcing stroke while the said power-piston is finishing the gas-compressing stroke. The advantage of this is that the charge of gas is supplied to the chamber 84 before the contents of said chamber are under high compression, and thus there is but little power lost in this pumping operation, and, again, the pump-piston's air-compressing strokes are timed so that the air-reservoir 25 will always be charged with compressed air at the moments when the two heads alternately uncover their respective exhaust-ports 84 85 to blow out the flame or burning product and prepare the said chambers for the charges of explosive gas, as above referred to.

To fire the compressed explosive gas within the chambers 84 85, I have provided the power-cylinder valve-chest 18 with firing chambers or passages 90, which are extensions of the chambers 22 at the end thereof opposite where they enter through the ports 17 into communication with the said chambers 84 85 of the power-cylinder. I fasten to the valve-chest adjacent to said chambers or passages 90 an ignition chimney or furnace, the base 91 of which is provided with fire-passages 92, coinciding with the chambers or passages 91 at one end and at their opposite ends being open to the chambers of the ignition-tubes 93. Said ignition-tubes 93 are seated upon the said base 91 and project centrally up through the chimney 94, so as to be highly heated by the burning gaseous mixture within said chimney. The base-piece 91 is hollowed out at its upper side, as at 95, to receive a cylindrical grating 96 and is suitably provided with gas and air supply passages 97, as indicated in Fig. 20, or in any other suitable manner. The gas and air enters the recess or chamber in the base 91 into an annular space 98 around the grating and is diffused, so that it enters the chimney through the openings in the grating evenly to provide a flame of uniform heating capacity on all sides of the tube, the flame being directed against the tubes.

I may arrange the grating within the chimney, as in Fig. 8, in which case the gas and air inlet is formed in said chimney rather than in the base, and the latter construction is preferred where the device is supplied with ordinary city gas. The chimney, above the grating, is provided with air-openings 150, which serve to produce a more perfect combustion.

In Figs. 6 and 18 I have shown the chimney provided with carbureting apparatus for producing gas from a hydrocarbon liquid— such as petroleum, benzin, naphtha, or the like. Around said chimney I arrange a box or casing 991 to form a chamber 99, with which the gas-supply pipe 62 connects. This chamber receives a liquid-hydrocarbon pipe 100 and an air-supply pipe 101, which pipes are provided with valves 102 and 103. The valve 103 presents a larger suction-surface to the gas within the chamber 99 and pipe 101 and is lifted with sufficient power to open the valve 102 for the liquid hydrocarbon. To this end the valve 103 is provided with a stem 104, which is in alinement with the stem 140 of the valve 102. When the valve 103 raises its stem 104, it engages the end of the stem 140, and thus opens the valve 102 to allow a downflow of hydrocarbon fluid. Said valves are thus operated automatically and simultaneously by the suction of the pump-piston 31, acting on the valve 103, so that when a draft of the gas is drawn to the pump-cylinder from the chamber 99 the said valve 103 is opened and with it the valve 102. The opening of the two valves allows an inflow of air through the pipe 101 and a downflow of hydrocarbon liquid from the pipe 105 by gravity through the pipe 100 into the chamber 99. Here the liquid and air are together brought into contact with the highly-heated walls of the chamber and the desired explosive gas is produced.

When the engine is of large size or of high compression, I prefer to control the firing more effectually to prevent early or premature firing when starting the engine by the use of a valve 107, Fig. 10, so that the engineer in turning the fly-wheel to secure the initial charges of gas and air will not receive any injury due to an early or premature explosion of gas before the fly-wheel crank is past its center and the sudden back movement of said fly-wheel, as will be understood. Said valve 107 is arranged in the valve-chest or other portion of the firing apparatus to cut off communication through the passages 92 22 17 of the firing-tube with the power-cylinder chambers alternately. To this end the said valve is given a longitudinal reciprocation by means of an eccentric and connecting-rod (not shown) or by any other suitable means. As the valve 107 reciprocates the valve-openings 108 are brought alternately into coincidence with the passages 22, so that the compressed gas is forced from the chambers 84 85 into the open end of the tube 93, pressing back the product already contained therein, so that when the inflammable gas is highly compressed and in condition for ignition it will be brought into contact with the highly-heated tube and fired, the flame traveling with great rapidity to the power-cylinder chamber in open communication with said tube, exploding the charge of gas therein and the expansive force produced by the explosion forcing the power-piston toward the exhaust-port, as will be understood.

Instead of the firing-tube 93 being arranged in a chimney, as described, I may under certain conditions fire the charges by electricity. When this is done, I provide a gas-chamber 110, such as shown in Figs. 11 and 12, opening into the chambers 84 85, the passage being controlled by the valve 107, as hereinbefore described. To the wall of this chamber I fix in any desirable manner a terminal contact 111 in circuit with an electrical generator, and within said chamber I arrange a reciprocating contact 112, which is preferably pivoted upon a rod 113, operated by the crank-shaft or other moving part of the engine. The contacts of the terminals are timed to produce a spark and ignite the explosive gas when the valve 107 opens the passage to the power-cylinder chamber and when the said gas is at a point of high compression.

In operating the engine, the parts being arranged substantially as described, I first light the gas in the furnace or ignition chimney 94 to heat the tube 93 therein. I then open the valve or cock 114, Fig. 5, of the gas-supply pipe 62 and allow the gas to flow into the chamber 115 above the valve 57, Fig. 8. After the tubes 93 are properly heated I then turn the fly-wheel 116 by hand and work the coöperating parts, whereby a charge of gas is drawn into the pump through the chambers 50 33, air also being drawn in through the valve-opening 48. Also a charge of atmospheric air is forced forward into the reservoir 25, but this charge is not compressed, as there is at first no counteracting pressure holding the valve 28 to its seat. From the passage 33 the explosive mixture passes into the upper part of the pump-cylinder chamber. Continued movement of the fly-wheel and the parts connected therewith causes the gas to be forced forward and into one of the chambers of the power-cylinder, where it is compressed and forced into the ignition-tube 93 and exploded. The expansion produced at the explosion imparts power to the piston 7, so that further hand manipulation of the fly-wheel is rendered unnecessary. While the mixed explosive gas is being compressed and exploded, as described, the pump forces a supply of atmospheric air into the reservoir 25, as heretofore described, which is prevented from entering the power-cylinder chamber in communication therewith by the pressure of the said explosive gas. After explosion the power-piston head acted on by the expansive gas moves toward its exhaust-port 83, and when it arrives thereat the products of the explosion pass out, relieving the chamber of pressure, so that the compressed atmospheric air is free to enter and force out the flame, preparing the chamber for another charge of explosive gas. These operations are repeated alternately in the two power-cylinder chambers and rapidly succeed one another. After the engine is well under way the supply of gas is regulated by the cock-valve 54, the supply being increased or diminished in accordance with the richness of the gas. The governor prevents an undue velocity being attained by the engine in the manner already fully described.

While I have described the engine in one of its forms, I am well aware that it may be varied in construction, both in its general construction and in the construction of details, without departing from the spirit and scope of the invention, and thus I do not wish to be understood as limiting myself by the positive descriptive terms employed, excepting as the prior state of the art may require or render necessary.

Having thus described the invention, what I claim as new is—

1. In a gas-engine, a power-cylinder divided by a partition into two independent chambers, a piston having heads working in said chambers, means for supplying the said chambers alternately with gas, and means for introducing atmospheric air to said chambers alternately with the introduction of gas thereto, and means for igniting said gas, all arranged and combined, substantially as set forth.

2. In a gas-engine, a power-cylinder interiorly divided by a partition, a piston having connected heads working in said cylinder one of which heads compresses, or is adapted to compress, a charge of explosive mixture while the other is making its stroke due to the explosion of a previously compressed charge and means for supplying the cylinder with charges of explosive mixture and means for igniting said charges, and means for introducing atmospheric air to said cylinder after explosion and before the supply of a new charge of mixture, said parts being combined substantially as set forth.

3. In a gas-engine, the combination with the cylinder having open ends and a central partition, of a piston having connected heads working in said open ends, means for supplying the cylinder with combustible gas, means for igniting the same and means for exhausting the product of combustion, and means for introducing atmospheric air to the cylinder immediately following the exhausting product, said parts being combined, substantially as set forth.

4. In a gas-engine, the combination with a cylinder having independent chambers, of a piston having heads working in unison in said chambers, the said chambers opening into a common gas-supply duct, a valved chest having gas-supply chambers, means for forcing gas into said gas-supply chambers and means for igniting the gas, and an atmospheric-air chamber 25, formed in communication with the two cylinder-chambers, and supplying said cylinder-chambers with atmospheric air alternately with the supply of explosive gas and valves for controlling the supply of atmospheric air, substantially as set forth.

5. In a gas-engine, the combination with a cylinder having independent chambers, of piston-heads 87, 87, working in said chambers and having lateral flanges or extensions 14, rods 12, 12, connecting said heads so that they reciprocate in unison, a crank-shaft and connecting-rod receiving movement from the connected heads, means for supplying the chambers with explosive gas, means for firing said gas and means for exhausting the product of the explosion, an atmospheric-air chamber 25, formed in communication with said independent chambers and supplying said independent chambers with atmospheric air, valves controlling the supply of air to said independent chambers and a pump for compressing air into said chamber 25, substantially as set forth.

6. In a gas-engine, the combination with a cylinder, open at its opposite ends and having a central partition forming independent chambers at the opposite ends of said cylinder of a piston having heads working in said chamber and being connected to a common crank-shaft, said crank-shaft, and means for supplying said chambers with gas and means for igniting said gas, and means for introducing atmospheric air under compression to said independent chambers, air-compressing means and means for controlling the introduction of said atmospheric air to the cylinder-chambers, substantially as set forth.

7. In a gas-engine, the combination with a cylinder having independent chambers 84, 85, of piston-heads working in said chambers and transmitting power for forcing gas into said chambers alternately and means for securing the desired alternation of supply, of gas, an atmospheric-air reservoir or chamber opening to said independent chambers, valves controlling the passage of air to said independent chambers, and means for compressing the atmospheric air in said reservoir or chamber, whereby it will pass into said independent chambers when said valves are opened, substantially as set forth.

8. In a gas-engine, the combination with a cylinder having independent chambers 84, 85, of piston-heads working in said chambers and transmitting power to common connections therewith, said connections, a pump and gas-ducts for conveying gas from said pump to the said chambers, and means for effecting a transmission of gas first into one chamber and then into the other, gas-igniting means and means for effecting an alternation of movement of said piston-heads whereby when one head is compressing the gas preliminary to an explosion the other will travel under the impulse given by an explosion, and atmospheric-air-supplying means for introducing non-explosive atmospheric air into said chambers 84, 85, immediately after the explosions therein and immediately following the outpassage of the product, substantially as set forth.

9. In a gas-engine, the combination with a power-cylinder and its piston having two heads working therein, of a pump having a piston, the chamber of which pump is in open communication with said power-cylinder and means for effecting two strokes of the pump-piston for every one of the power-piston, suitable ducts for conveying the gas, means for igniting said gas and means for securing the relative operations of the power and pump pistons, substantially as set forth.

10. In a gas-engine, the combination with a power-cylinder and its piston, of a pump and its piston and connections joining the two said pistons arranged, operating and effecting two strokes of the said pump-piston to every one of the power-piston, means for conducting the gas from the pump to the power-cylinder, and means for igniting the gas, substantially as set forth.

11. In a gas-engine, the combination with a power-cylinder and its piston, of a pump, and its piston and a train of rods and levers transmitting motion from the power-piston to and accelerating or multiplying the number of strokes of the pump-piston, substantially as set forth.

12. In a gas-engine, the combination with the power-cylinder having separate chambers and its piston having two heads one of which heads makes its power stroke while the other is effecting a compression of the gas, of a pump and ducts connecting the same with the power-cylinder and a train of levers and rods in connection with the pump-piston and means for operating the same, to effect two strokes of said pump-piston to one of the power-piston, ducts connecting pump and power cylinders, and means for firing the gas pumped into said power-cylinder, substantially as set forth.

13. In a gas-engine, the combination with the power-cylinder having a central partition and opposite chambers, of a power-piston having heads in said chambers, gas-chambers in open communication with each of said cylinder-chambers, a pump for forcing gas into said gas-chambers, means for igniting the gas, and means for operating the pump, an air-chamber and means for forcing non-inflammable air into the cylinder-chambers alternately with the charges of gas, substantially as set forth.

14. In a gas-engine, the combination with a power-cylinder and its piston, gas-ducts for conveying combustible or explosive gas to said power-cylinder and air-ducts for conveying atmospheric air to said power-cylinder, of a pump having a cylinder in open communication with both said gas and air ducts, and a piston which alternately forces gas and air through said ducts whereby the gas may be first exploded and afterward the burning product be blown outward by the air preliminary to the introduction of a new charge of gas, and means for igniting the explosive gas, substantially as set forth.

15. In a gas-engine, the combination with a power cylinder and piston, of a pump-cylinder having explosive-mixture ducts leading therefrom for conducting the combustible gas to said power-cylinder, atmospheric-air ducts, also leading from said pump for conducting the air to the power-cylinder, a pump-piston and means for reciprocating the said piston and alternately forcing combustible gas and atmospheric air to the power-piston, substantially as and for the purposes set forth.

16. In a gas-engine, the combination with a power-cylinder having independent chambers, a power-piston having two heads, a pump-cylinder and piston-ducts leading combustible gas and atmospheric air separately from said pump-cylinder to the power-cylinder, and means for igniting the gas, substantially as set forth.

17. In a gas-engine, the combination with a power-cylinder having independent chambers, a power-piston having heads working in said chambers, a chest with chambers 22, 22, in open communication with said power-cylinder chambers with a combustible-gas chamber, passage or duct, and with an atmospheric-air chamber, passage or duct, of a pump-cylinder in communication with said combustible-gas chamber and with said atmospheric-air chamber, a pump-piston and means for reciprocating the same to effect a transmission of air and combustible gas alternately and means for igniting the combustible gas, substantially as set forth.

18. In a gas-engine, the combination with a power-cylinder having independent chambers, a power-piston having heads working in said chambers, a chest having chambers 22, 22 in open communication with said power-cylinder chambers and through valved openings with combustible-gas and atmospheric-air chambers or ducts, of a pump-cylinder open at one end to the gas chamber or duct and at the other end to the air chamber or duct, means for supplying the said pump-cylinder with gas and air, a pump-piston, and means for reciprocating the same, and means for igniting the gas, substantially as set forth.

19. In a gas-engine, the combination with a power-cylinder having independent chambers, a power-piston having heads working in said chambers, a chest having chambers 22, 22 in open communication with said power-cylinder chambers and through valved openings with combustible-gas and atmospheric-air chambers or ducts, of ignition-tubes also in open communication with said chambers 22, means for forcing atmospheric air and combustible gas through their respective ducts, and into said tubes, and means for operating the forcing means, substantially as set forth.

20. In a gas-engine, the combination with a power-cylinder having independent chambers 84, 85, a power-piston having heads working in said chambers, a chest cored or hollowed out to form chambers 22, 22, and 24, 25, each of said chambers 22, having communication through valved openings with said chambers 24, 25, pipes or ducts connecting said chambers 24, 25, with the pump-cylinder, of said pump-cylinder and a pump-piston operating therein, making two strokes for each one stroke of the power-piston, means for operating said pump-piston, means for supplying the pump-cylinder with gas and air separately, and means for igniting the gas when compressed in chambers 22, 22, 84, 85, substantially as set forth.

21. In a gas-engine, the combination with a power-cylinder having independent chambers 84, 85, a power-piston, a chest having chambers 22, 22, and chambers 24, 25, valves closing communication between the said chambers, 22, 22, 24, 25, of a pump for forcing air and combustible gas into said chambers 24, 25, alternately, means for operating said pump and means for supplying said pump with a combustible mixture of gas and air, and atmospheric air unmixed, substantially as set forth.

22. In a gas-engine, the combination with a power-cylinder having independent chambers 84, 85, a power-piston, and a chest having valves and ducts, of a pump and ducts conveying combustible gas separately from said pump to said chest, the movements of the operating parts of the pump and the power-piston being timed to effect a charge of gas to one of the power-cylinder chambers and a compression of the same, while the gas in the other cylinder-chamber is exploding or producing an expansion by which the power-piston is driven, substantially as set forth.

23. In a gas-engine, the combination with a power-cylinder, a power-piston, a chest having chambers or ducts and valves, of a pump and ducts conveying combustible gas and atmospheric air separately from said pump to said chest, the movements of said operating parts being timed and operating to effect first a charging of one power-cylinder chamber with gas, a compression, ignition and explosion of said charge, and then a charge of compressed atmospheric air whereby the product of the explosion is blown out from the said cylinder-chamber preliminary to the introduction of another charge, substantially as set forth.

24. In a gas-engine, the combination with a power cylinder and piston, a chest having chambers or ducts and valves of a pump and ducts conveying combustible gas and atmospheric air separately from the pump to the chest, the movements of said operating parts being timed to secure an alternation of charges of gas and air in said cylinder, substantially as set forth.

25. In a gas-engine, the combination with a power cylinder and piston, of a pump cylinder and piston, and valves and ducts for combustible gas and non-combustible fluid, such as atmospheric air, and means for operating said pump and for igniting the combustible gas, the said pump-piston and power-piston being timed in their relations to one another and to the coöperating parts and operating to effect a suction of gas and a compression of said gas in the power-cylinder, an ignition of the said gas, an exhaustion of the product and an introduction of said non-combustible fluid immediately following said exhaustion, substantially as set forth.

26. In a gas-engine, the combination with a power cylinder and piston, of a pump cylinder and piston, a chest having air and gas reservoirs or chambers, said pump-cylinder being connected to the power-cylinder and air-reservoir, and the pump-piston, in operation, forcing the combustible gas into the power-cylinder in one stroke and air into the air-reservoir in the return stroke, substantially as set forth.

27. In a gas-engine, the combination with a power cylinder and piston, the cylinder having separate chambers and exhaust and inlet ports and the piston having connected heads working in said separate chambers, a chest having chambers 22, 22, with igniting-furnaces in connection therewith, and combustible-gas and non-combustible-fluid chambers 24, 25, in communication with said chambers 22, of a pump-cylinder and ducts connecting the opposite ends thereof with said chambers 24, 25, a pump-piston and means for reciprocating the same and forcing the air into chamber 24, at one stroke and into chamber 25, at the return stroke and means for supplying the pump-cylinder with gas and air, substantially as set forth.

28. In a gas-engine, the combination with a power-cylinder having separate chambers, a power-piston having heads working in said chambers of a pump timed to effect two strokes of its piston for every one of the power-piston, the pump-piston supplying a charge of combustible gas and a charge of non-combustible fluid to the power-cylinder at every stroke of the said power-piston, substantially as set forth.

29. In a gas-engine, the combination with a power-cylinder having separate chambers, a power-piston having heads working in said chambers, and suitable ducts, chambers, and valves, of a pump having four operative strokes for every two of the power-piston, the pistons and operative parts being timed and operating to effect a compression of combustible gas in one chamber and an explosion, expansion and exhaustion of gas and an introduction of non-combustible gas in the other, at one stroke of said power-piston and a repetition of said operations in said chambers, reversely, at its return stroke substantially as set forth.

30. In a gas-engine, the combination with the power-cylinder having separate chambers 84, 85, of a chest having gas-chambers 22, 22, opening into said cylinder on opposite sides of the separating-partition 9, at one end and having separate firing-tubes at the opposite end and means for introducing gas into said chambers under compression, substantially as set forth.

31. In a gas-engine, the combination with the power-cylinder, having separate chambers with a diaphragm or partition 9, between, of a chest having chambers 22, 22, opening into the cylinder-chambers at opposite sides of the partition and having air and gas valves and having separate firing-tubes at the ends opposite the ends communicating with the cylinder-chambers, gas and air chambers communicating with said chambers 22, 22, the said valves controlling the passages of communication and means for forcing gas and air into said gas and air chambers, substantially as set forth.

32. In a gas-engine, the combination with the power-cylinder having chambers 84, 85, of a chest having chambers 22, 22, a furnace and a reciprocating valve cutting off communication first through one and then through the other of said chambers 22, substantially as set forth.

33. In a gas-engine, the combination with the power-cylinder having chambers 84, 85, and ports 17, 17 of a chest cored out and having chambers 22, 22, and 24, 25, valves 26, 26, and 28, 28, a furnace opening separately to said chambers 22, 22, at the outer end of the chest, the valves 26, to the chambers 22, being arranged between said furnace and power-cylinder chamber and means for forcing combustible gas and atmospheric air through said valves and chambers, substantially as set forth.

34. In a gas-engine, the combination with the cylinder having separate chambers and a power-piston having heads working therein, a valve-chest having valves and chambers and a furnace, ports leading gas and air independently to said chest-chambers, of a pump having a cylinder and cylinder extensions with chambers 33, 34, and 39, 41, valves 35, and 40, and a valved air-inlet 42, for atmospheric air, substantially as set forth.

35. In a gas-engine, the combination with the power-cylinder having separate chambers and a piston having heads working therein, a valve-chest having valves and chambers for combustible gas and atmospheric air, and ducts leading to said chambers, of a pump-cylinder in connection with said ducts and having at one end passages for the inflow and outflow of combustible gas and at the opposite end passages for the inflow and outflow of atmospheric air, valves controlling the flow of said combustible gas and ports governing the flow of atmospheric air, substantially as and for the purposes set forth.

36. In a gas-engine, the combination with the power-cylinder and piston and firing devices, of a pump in connection with said power-cylinder, said pump comprising a reciprocating piston and a cylinder having a chambered and valved extension and a mixing device having gas and air inlets and valves regulating and controlling the proportional supply of gas and air, and an inlet for atmospheric air, the said pump-piston alternately forcing the mixed gases and atmospheric air to said cylinder, substantially as set forth.

37. In a gas-engine, the mixing device, comprising a chambered casting having an air-passage, and a seat for a cock-like valve, said valve and a handle for turning the same to prevent the flow of combustible gas to the air-passage, said cock-like valve itself providing a seat for a valve, a valve 57, seated in said cock-like valve and means for opening said valve 57, as the engine operates normally to allow an inflow of gas to the air-passage, whereby the gas and air are mixed prior to passing to the power-cylinder, substantially as set forth.

38. In a gas-engine, the mixing device herein described, comprising a chambered casting having an air-passage and a seat for a cock-like valve 54, and an air-valve 49, means for turning the cock-like valve for closing the air-passage 50, said cock-like valve having a seat for a valve 55, and said valve 55, in turn, having a seat for a valve 57, adapted to open and close to control the flow of combustible gas to the pump, a stem 61, in connection with said valve 51, a bell-crank lever 6, and a cam 58, and means for operating the same, said parts being combined, substantially as set forth.

39. In a gas-engine, the combination with the mixing device having valved openings for air and inflammable gas and means for regulating and controlling the supply and mixture thereof, of a pump in connection with the mixing device for drawing in said mixture, a pure-air-supply pipe also in connection with said pump, the air-supply connection being with the pump-cylinder at the end thereof, opposite that at which the mixture is drawn in, means for transmitting the air and mixture separately to the power-cylinder, said power-cylinder and means for igniting the said mixture when in said cylinder substantially as set forth.

40. In a gas-engine, the combination with the casting 47, pump-ignition furnace, power-cylinder, piston and connections, of the valve-cock and its handle 54, regulating-valve 55, having a tubular stem and handle, a valve 57, and connections thereof, with the governor and said governor, substantially as set forth.

41. In a gas-engine, the combination with the mixing device provided with a casing having a passage or chamber and an air-inlet, a valve located in said passage, a cock-like valve fitted in said chamber an air-inlet passage and means to regulate said air-passage, and also having gas, a passage, a second cock-like valve fitted within said air-inlet cock having gas-inlet passages and adapted to regulate inflow of gas and having a seat at its upper end, and a reciprocating valve within said second cock adapted to open and close said gas-inlet passages, said parts being combined substantially as set forth.

42. In a gas-engine, the combination with the mixing device having a casing and an extended air-chamber and a valve located therein adapted to work automatically and a cock-like valve having an air-passage fitted within said casing and adapted to regulate the air-passage and a second cock-like valve having a tubular extension upon its lower end and a seat upon its upper end and gas-inlet passages adapted to regulate the flow of gas and a reciprocating valve having a stem extending down through the tubular extension of said second cock and means to positively actuate said valve and open and close said gas-passages said parts being combined, substantially as set forth.

43. In a gas-engine, the combination with a power cylinder and piston, and valves and ducts for supplying the same with explosive gas, an ignition-furnace, and a pump, for forcing said gas, of a carbureting device in connection with said furnace, and heated by the same, whereby the waste heat of said furnace is utilized in converting the liquid hydrocarbon and air into explosive gas, the hydrocarbon-valve being connected with the air-supply valve whereby when the latter is drawn open by the action of the pump the said hydrocarbon-valve will be likewise opened, substantially as set forth.

44. In a gas-engine, the combination with a power-cylinder, its piston, valves, and ducts, a pump supplying explosive gas thereto, an ignition-furnace communicating with the chamber of said power-cylinder to explode a charge of gas therein and a carbureting device arranged at said furnace whereby the flame employed in heating the said furnace will also heat the carbureting device to produce the explosive gas to be employed in working the engine, the said pump for forcing the gas being independent of said piston and cylinder and serving not only in supplying the explosive gas to the said cylinder and piston but also in operating the air and hydrocarbon valves of the carbureting device, substantially as set forth.

45. In a gas-engine, the combination with a power-cylinder, its piston, valves and ducts, of a pump supplying explosive gas thereto, an ignition-furnace comprising a chimney and central tube or tubes and a cylindrical grating with an annular gas-supply chamber therearound, the gas being directed by the opening in said grating toward the said tube or tubes substantially as set forth.

46. In a gas-engine, the combination with a power-cylinder, its piston, valves and ducts, a pump supplying explosive gas thereto, of an ignition-furnace comprising a chimney, a base therefor, a tube or tubes and a cylindrical grating forming an annular chamber around the same, the openings of said grating directing the gas toward the said tube or tubes, the chimney having air-openings therethrough above said grating, substantially as set forth.

47. In a gas-engine, the combination with the base, chimney, cylindrical grating and tubes, of a box or case forming a carbureting-chamber 99, around said chimney and pipes for conducting air and hydrocarbon liquid to said chamber, and a pipe for conducting the combustible gas therefrom, substantially as set forth.

48. In a gas-engine, the combination with the carbureting-box having chamber 99, pipes 100, 101, and air and liquid-hydrocarbon valves arranged to operate simultaneously, the stem of one valve engaging the other to raise the same, and a pump for raising the valves to allow an inflow of air and hydrocarbon liquid and effecting a withdrawal of combustible gas, substantially as set forth.

49. In a gas-engine, the combination with a carbureting box or inclosure having chamber 99, an air-pipe 101, and a downwardly-inclined pipe 100, a valve 103, adapted to be raised by suction from the chamber 99, and having a valve-stem 104, extending toward a second valve 102, and said valve 102 having a stem in alinement with the stem 104, and engaged thereby, when the valve 103 is opened, to open said valve 102, and allow a downflow of liquid hydrocarbon into the chamber 99, and means for producing the suction in said chamber 99, substantially as set forth.

50. In a gas-engine, the combination with the power-piston 7, pump-piston 31, and suitable fixtures, such as 6 and 81, of a pivoted rod 73, connected to said power-piston, a rod 71, pivoted to one of said fixtures and to said rod 73, a bell-crank 76, fulcrumed upon the other fixture and having an arm connected to the pump-piston and a rod 74, pivoted to the other arm of the bell-crank at one end and at the other pivoted to said rods 71, 73, where said rods are pivoted to one another, substantially as set forth.

51. In a gas-engine, the combination with the power-piston 7, and pump-piston 31, and coöperating parts, of pivotally-joined rods 71, connected at the joint to the power-piston and adapted to be brought into alinement at the middle of the stroke of the power-piston, said rods at the ends opposite the joint being pivoted to a fixture and to a pump-piston-operating device, substantially as set forth.

52. In a gas-engine, the combination with the two reciprocating parts and suitable parts 6, 81, providing fixed bearings, rods 71, 74, joined to one another, the rod 71, being pivoted on one of the fixed bearings, a bell-crank fulcrumed on the other of the fixtures, and rods 74, and connected to one of said parallel moving parts, and a rod arranged in connection with the joined rods, and connecting the same with the other of said parallel moving parts, and means for operating the last-said moving part and its connecting-rod, 73, so that the joint of connection between said rods 71, 74, moves back and forth over the line of alinement of said rods, substantially as and for the purposes set forth.

53. The process of preventing premature explosion or ignition of explosive gas in a gas-engine which consists in interposing a charge of non-explosive air between an explosive charge of gas and the product of a previously-ignited charge of gas, substantially as set forth.

In testimony that I claim the foregoing I have hereunto set my hand this 22d day of April, 1896.

PETER MURRAY.

Witnesses:
CHARLES H. PELL,
C. B. PITNEY.